United States Patent
Banga et al.

(10) Patent No.: US 12,501,083 B2
(45) Date of Patent: Dec. 16, 2025

(54) NON-CONCURRENT SUPPLEMENTAL CONTENT LOAD FOR LIVESTREAMS

(71) Applicant: GOOGLE LLC, Mountain View, CA (US)

(72) Inventors: Saksham Banga, Mountain View, CA (US); Matt Piotrowski, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 27 days.

(21) Appl. No.: 18/398,581

(22) Filed: Dec. 28, 2023

(65) Prior Publication Data

US 2025/0220252 A1 Jul. 3, 2025

(51) Int. Cl.
*H04N 21/234* (2011.01)
*H04N 21/2187* (2011.01)
*H04N 21/431* (2011.01)

(52) U.S. Cl.
CPC ... *H04N 21/23424* (2013.01); *H04N 21/2187* (2013.01); *H04N 21/4316* (2013.01)

(58) Field of Classification Search
CPC ......... H04N 21/23424; H04N 21/2187; H04N 21/4316
See application file for complete search history.

(56) References Cited

U.S. PATENT DOCUMENTS

| | | | |
|---|---|---|---|
| 10,373,196 B2 | 8/2019 | Ma et al. | |
| 10,565,607 B2 * | 2/2020 | Brody | G06Q 30/00 |
| 11,778,247 B2 | 10/2023 | Weiner et al. | |
| 2014/0196094 A1 * | 7/2014 | Singh | H04N 21/482 |
| 2020/0204849 A1 * | 6/2020 | Loheide | H04N 21/262 |

OTHER PUBLICATIONS

Goldwaser, Raphaël; "How to implement reliable dynamic ad insertion using AWS Media Services" AWS; Jan. 20, 2022. Retrieved from the internet at: <https://aws.amazon.com/blogs/media/how-to-implement-reliable-dynamic-ad-insertion-using-aws-media-services/>.

Metricool, "Ads on Twitch: how to advertise during your streaming" Jan. 27, 2021. Retrieved from the Internet at <https://metricool.com/ads-on-twitch/>.

Gotter, Ana; "Facebook Live Ads: Everything You Need to Know" Feb. 20, 2018. Retrieved from the Internet at <https://adespresso.com/blog/facebook-live-ads-everything-need-know/>.

* cited by examiner

*Primary Examiner* — Anthony Bantamoi
(74) *Attorney, Agent, or Firm* — MARSHALL, GERSTEIN & BORUN LLP

(57) ABSTRACT

The systems and methods disclosed herein relate to providing or presenting supplemental content non-concurrently during a livestream. In one embodiment, a method for providing supplemental content includes receiving from a client device a request for a supplemental content item; determining whether an elapsed time between the request for the supplemental content item and an earlier event exceeds a supplemental content interval; and responsive to determining that the elapsed time exceeds the supplemental content interval, causing the supplemental content item to be transmitted to the client device.

13 Claims, 9 Drawing Sheets

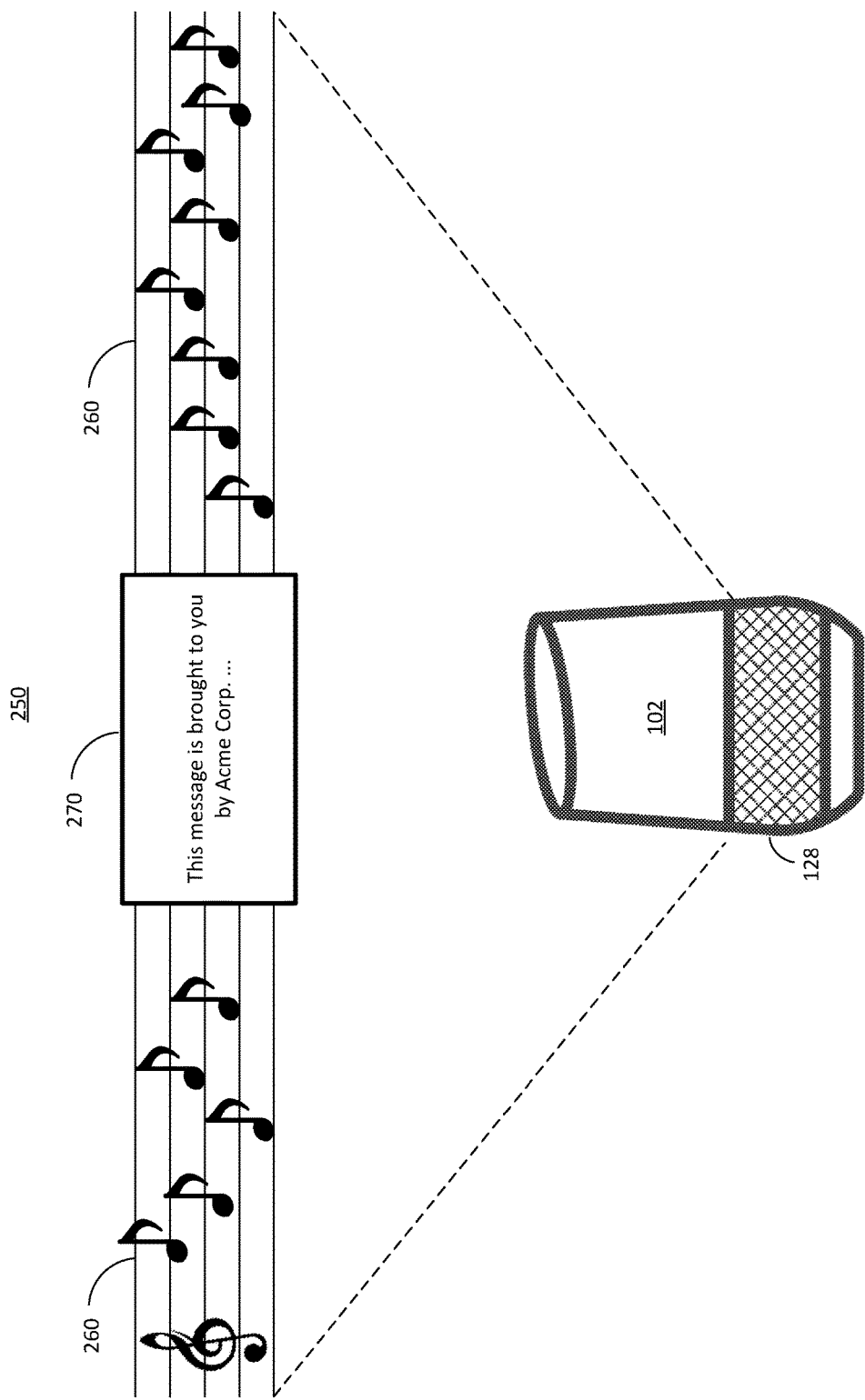

NON-CONCURRENT SUPPLEMENTAL CONTENT LOAD FOR LIVESTREAMS

FIELD OF TECHNOLOGY

The present disclosure relates to providing content to client devices and, more specifically, to providing supplemental content items to the client devices during a livestream.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

In existing systems, a provider may broadcast a livestream over a network to a plurality of client devices. The provider may indicate times at which one or more supplemental content items can be presented on the client devices during the presentation of the livestream. Following a traditional television or radio broadcast model, the one or more supplemental content items (e.g., commercial breaks) are presented at fixed times, e.g., one every 30 minutes, that are synchronized across the plurality of content devices.

One drawback to this fixed timing approach is that it does not properly account for client devices that join the livestream after the start time and/or leave the livestream before the end time. These client devices may receive fewer supplemental content items than intended by the livestream provider and/or livestream content creator on account of joining the livestream after one fixed supplemental content presentation time and/or leaving the livestream before another fixed supplemental content presentation time. An additional drawback is that the approach does not properly account for client devices that join the livestream shortly before a fixed supplemental content presentation time. The users of these client devices may end up viewing supplemental content items far earlier into their livestream viewing experience than other users, or they may end up not viewing any supplemental content items, etc.

Another drawback is that a content server may receive excessive supplemental content item demand spikes at the fixed supplemental content display or play times. Due to limitations in network and/or processing resources, these spikes may in some cases delay the provision of supplemental content to client devices, and in some cases, due to resource excessive resource utilization, even disturb the delivery of the primary content.

In view of this and other challenges, there is a need for systems and methods for non-concurrent supplemental content item load for livestreams.

SUMMARY

In some implementations described herein, a server may transmit, i.e., broadcast or multicast, a livestream to a plurality of client devices. Unlike video or audio that is played on demand, the livestream may be a live media broadcast that begins and ends at fixed times. The livestream may include a plurality of supplemental content break markers spaced apart in time. Each such marker has its own timestamp in the livestream, along with the duration for which the marker holds. When the livestream reaches one of the supplemental content break markers, a content server or each client device may determine how much time has elapsed since an earlier event, e.g., when the client device last presented a supplemental content item or joined the livestream. If the content server or client device determines that the elapsed time exceeds some specified threshold time (also referred to herein as a "supplemental content interval"), the client device may present, i.e., display or play, one or more supplemental content items, and the content server or client device may update the last presentation time to reflect this most recent interaction accordingly. If the content server or the client device determines that the elapsed time is less than or equal to the threshold, the client device may skip presenting the one or more supplemental content items. Thus, different client devices may present supplemental content items at different times based on different elapsed times.

In one example implementation, a method for providing supplemental content during a livestream comprising a plurality of supplemental content break markers spaced apart in time according to a break interval includes (1) receiving from a client device of a plurality of client devices, and responsive to the livestream reaching one of the plurality of supplemental content break markers, a request for a supplemental content item; (2) determining whether an elapsed time between the request for the supplemental content item and an earlier event exceeds a supplemental content interval, wherein the supplemental content interval is greater than the break interval; and (3) responsive to determining that the elapsed time exceeds the supplemental content interval, causing the supplemental content item to be transmitted to the client device.

In another example implementation, a method for receiving supplemental content during a livestream comprising a plurality of supplemental content break markers spaced apart in time according to a break interval includes (1) causing the livestream to be presented to a user; (2) while presenting the livestream, determining, upon reaching one of the plurality of supplemental content break markers, whether an elapsed time since an earlier event exceeds a supplemental content interval, wherein the supplemental content interval is greater than the break interval; (3) responsive to determining that the elapsed time exceeds the supplemental content interval, causing one or more supplemental content items to be presented to the user.

In one example implementation, a system for providing supplemental content during a livestream comprising a plurality of supplemental content break markers spaced apart in time according to a break interval includes (A) one or more processors; and (B) a memory storing instructions that, when executed by the one or more processors, cause the one or more processors to perform operations including (1) receiving from a client device of a plurality of client devices, and responsive to the livestream reaching one of the plurality of supplemental content break markers, a request for a supplemental content item; (2) determining whether an elapsed time between the request for the supplemental content item and an earlier event exceeds a supplemental content interval, wherein the supplemental content interval is greater than the break interval; and (3) responsive to determining that the elapsed time exceeds the supplemental content interval, causing the supplemental content item to be transmitted to the client device.

In another example implementation, a system for receiving supplemental content during a livestream comprising a plurality of supplemental content break markers spaced apart in time according to a break interval includes (A) one or more processors; and (B) a memory storing instructions that, when executed by the one or more processors, cause the one or more processors to perform operations including (1) causing the livestream to be presented to a user; (2) while presenting the livestream, determining, upon reaching one of the plurality of supplemental content break markers, whether an elapsed time since an earlier event exceeds a supplemental content interval, wherein the supplemental content interval is greater than the break interval; (3) responsive to determining that the elapsed time exceeds the supplemental content interval, causing one or more supplemental content items to be presented to the user.

The non-concurrent supplemental content item methods and systems disclosed herein provide improvements in computer functionality at least because the non-concurrent supplemental content item fetches are distributed over time, thus reducing supplemental content item demand spikes that negatively impact server and network performance. That is, instead of each client device simultaneously fetching supplemental content items from a content server, the disclosed methods and systems distribute the supplemental content fetches over time. This results in less peak demand on the server and network. More generally, the methods and systems disclosed herein may prevent users of certain client devices from viewing supplemental content items far earlier into their livestream viewing experience than users of other client devices, and/or prevent scenarios in which certain users are not presented with any supplemental content despite viewing the livestream as long as other users who were presented with such content, thereby leading to a more equitable distribution of supplemental content.

Additional, alternate and/or fewer actions, steps, features, and/or functionality may be included in an aspect and/or embodiments, including those described elsewhere herein.

BRIEF DESCRIPTION OF THE DRAWINGS

FIG. 2B depicts an exemplary client device playing an audio broadcast including a livestream and a supplemental content item.

DETAILED DESCRIPTION OF THE DRAWINGS

Figure 1:
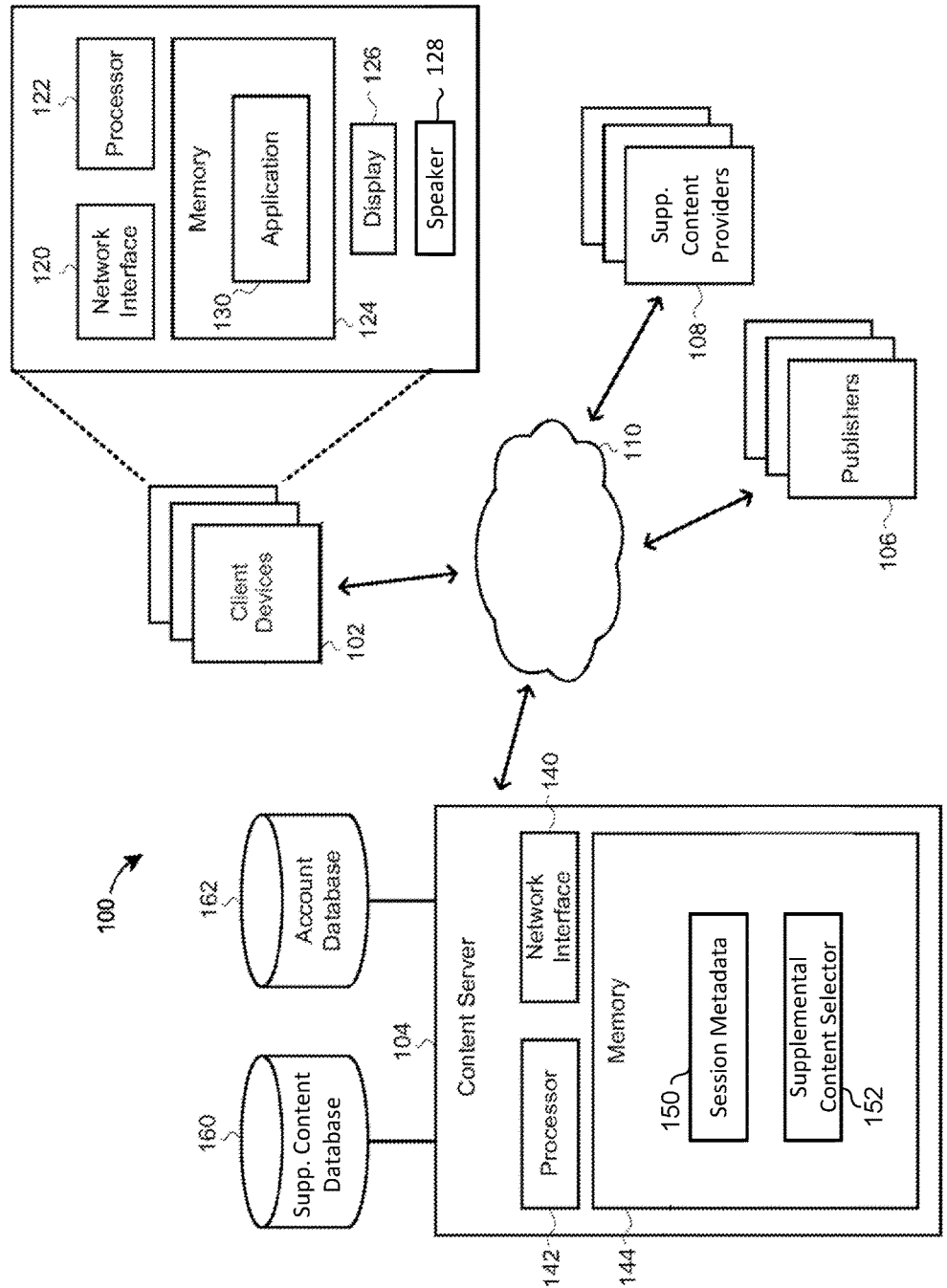
FIG. 1 is a block diagram of an example system in which techniques for providing livestreams and supplemental content items to client devices can be implemented.

FIG. 1 illustrates an example system 100 in which one or more techniques for providing non-concurrent supplemental content item loads in a livestream may be implemented. The example system 100 includes a plurality of client devices 102, a content server 104, one or more publishers 106, one or more supplemental content providers 108, and a network 110. The content server 104 is remote from the client devices 102 and is communicatively coupled to the client devices 102 via the network 110. The communicative/network connections shown in FIG. 1 for publishers 106 and supplemental content providers 108 represent communicative/network connections with computing devices or systems that are associated with the publishers 106 and supplemental content providers 108, respectively.

The network 110 may be a single communication network (e.g., the Internet), and in some implementations also includes one or more additional networks. As just one specific example, the network 110 may include a cellular network, the Internet, a wide area network (WAN), and a server-side local area network (LAN).

Generally, the client devices 102 may access livestreams hosted by the content server 104 and/or publishers 106, and the content server 104 may select supplemental content items provided by supplemental content providers 108 to populate supplemental content slots within those livestreams. For example, the livestreams may include streaming videos or streaming audio supplied by publishers 106, and supplemental content providers 108 may provide supplemental content items that the content server 104 can then select for filling supplemental content slots within those livestreams. The supplemental content slots may be distributed in time throughout the livestream. The supplemental content items themselves may include text, images, audio, or video, or any combination thereof, and may or may not include audio components.

The client devices 102 may include any stationary, mobile, and/or portable computing devices with wired and/or wireless communication capability (e.g., a smartphone, a tablet computer, a laptop computer, a desktop computer, a smart home device, a smart wearable device such as smart glasses, smart headsets, or a smart watch, a vehicle head unit computer, etc.). In the example implementation of FIG. 1, each of the client devices 102 (also referred to singularly herein as "client device 102") may include a network interface 120, a processor 122, memory 124, a display 126, and a speaker 128. The processor 122 may be a single processor (e.g., a central processing unit (CPU)), or may include a set of processors (e.g., multiple CPUs, or one or more CPUs and one or more graphics processing units (GPUs)).

The memory 124 may include one or more computer-readable, non-transitory storage units or devices, which may include persistent (e.g., hard disk) and/or non-persistent memory components. The memory 124 may store instructions that are executable on the processor 122 to perform various operations, including the instructions of various software applications and the data generated and/or used by such applications. In the example implementation of FIG. 1, the memory 124 may store at least an application 130, which may be, for example, a web browser application (e.g., Chrome), or a mobile application (e.g., YouTube) downloaded from an application store.

Generally, the application 130 may be executed by the processor 122 to present the livestream to the users of the client devices 102 via the display 126 and/or the speaker 128, where the livestream may include multiple supplemental content slots for non-concurrently presenting supplemental content items. In an implementation where the application 130 is a web browser, for instance, the livestream may be included on a web page hosted by the content server or one of the publishers 106, with the browser causing the client device 102 to download HTML, scripts, and/or other code of the web page for presentation to a user via the display 126. As another example, the application 130 may be a video sharing application, such as YouTube, and the livestream may include a streaming video presented via the display 126. As another example, the application 130 may be a streaming audio application, and the livestream may include streaming audio played by the speaker 128.

The display 126 may include hardware, firmware, and/or software configured to enable a user to view visual outputs of the client device 102, and may use any suitable display technology (e.g., LED, OLED, LCD, etc.). In some implementations, the display 126 may be incorporated in a touchscreen having both display and manual input capabilities. Moreover, in some implementations where the client device 102 is a wearable device, the display 126 may be a transparent viewing component (e.g., lenses of smart glasses) with integrated electronic components. For example, the display 126 may include micro-LED or OLED electronics embedded in lenses of smart glasses.

The speaker 128 may include hardware, firmware, and/or software configured to enable a user to listen to audio outputs of the client device 102, and may use any suitable audio technology (e.g., headphones, wired or wireless speakers, etc.).

The network interface 120 may include hardware, firmware, and/or software configured to enable the client device 102 to exchange electronic data with the content server 104 and publishers 106 via the network 110. For example, the network interface 120 may include a cellular communication transceiver, a WiFi transceiver, and/or transceivers for one or more other wired and/or wireless communication technologies.

While FIG. 1 shows each of client devices 102 as a single component communicating directly (i.e., via network 110) with the content server 104 and/or the publishers 106, in some implementations the subcomponents of client device 102 shown in FIG. 1 are instead divided among two or more user-side devices. As just one example, a pair of smart glasses may include the processor 122, the memory 124, and the display 126, while a smartphone may include another processing unit, another memory, another display, and the network interface 120 and speaker 128. The smart glasses (or smart helmet, etc.) may then communicate as needed with the smartphone (e.g., via Bluetooth) to enable the operations described herein.

The content server 104 may include a network interface 140, a processor 142, and a memory 144. The network interface 140 may include hardware, firmware, and/or software configured to enable the content server 104 to exchange electronic data with the client device 102 and other devices via the network 110. For example, the network interface 140 may include a wired or wireless router and a modem. The processor 142 may be a single processor or may include two or more processors. As used herein, the term "server" can refer to a single computing device at a single location, or to multiple, coordinating computing devices that are either co-located or remotely distributed.

The memory 144 may be a computer-readable, non-transitory storage unit or device, or collection of units/devices, that may include persistent and/or non-persistent memory components. The memory 144 may store session metadata 150 and the instructions of a supplemental content selector 152, which may be executed by the processor 142.

The session metadata 150 may include information associated with the plurality of client devices 102. The information may include a livestream session start time, a last supplemental content item provision time, a number of supplemental content items provided, and/or other session information.

Generally, the supplemental content selector 152 may select supplemental content items that the content server 104 then provides/sends to one or more of the client devices 102 via the network 110. The supplemental content selector 152 may select particular supplemental content items using one or more supplemental content selection procedures.

The supplemental content selection procedures executed by the supplemental content selector 152 may be auctions, for example, with the supplemental content selector 152 selecting a winner based on bid amounts that various supplemental content providers 108 provide to the content server 104 or bid amounts that the content server 104 otherwise generates for the various supplemental content providers 108 (e.g., based on inputs from the supplemental content providers 108 such as preferred maximum bid amounts). As a more specific example, each supplemental content provider 108 may offer a maximum bid amount for placement of its supplemental content item, and the supplemental content selector 152 may select the supplemental content item associated with the supplemental content provider 108 having the highest bid. The content server 104 may then charge that highest bid amount (or the amount bid by the second-highest bidder, etc.) to the winning supplemental content provider 108, and select the supplemental content item associated with that supplemental content provider 108 to fill the supplemental content slot under consideration.

The supplemental content selection procedures may also, or instead, account for selection parameters other than bid amounts, such as the relevance of particular supplemental content items to a user of the client device 102 (or relevance to the livestream, etc.). The supplemental content selection procedures may be entirely rules-based, or may have one or more random components (e.g., random selection from a pool of candidates), etc.

The supplemental content items provided (e.g., created and/or sourced) by supplemental content providers 108 and available for selection by the supplemental content selector 152 may be stored, in some implementations, in a supplemental content database 160. The supplemental content database 160 may be stored in the memory 144 or may be stored in one or more memories that are remote from the content server 104, for example.

In some implementations, the publishers 106 and/or supplemental content providers 108 hold accounts related to the services provided by the content server 104. For example, the publishers 106 may create such accounts in order to monetize livestreams that they publish or otherwise make available (e.g., by selling supplemental content slots within the livestream), and/or the supplemental content providers 108 may create such accounts in order to locate and purchase supplemental content slots in which it would be particularly advantageous to present their supplemental content (e.g., supplemental content items). In these implementations, information associated with the publisher and/or supplemental content provider accounts may be stored in an account database 162. The account database 162 may be stored in the memory 144 or may be stored in one or more memories that are remote from the content server 104, for example. The account information may include information such as entity name, subscription level, entity preferences (e.g., brand control preferences), and so on. In some implementations, the account information includes selection parameters (e.g., bid amounts or maximum bid amounts) associated with different supplemental content providers 108, for use by the supplemental content selector 152 in selecting supplemental content as discussed elsewhere herein.

In some implementations, the system 100 is arranged in a manner different than that shown in FIG. 1. For example, the content server 104 may be associated with the same entity that sources the livestreams, in which case the system 100 may omit the publishers 106 (e.g., activities described herein for the publishers 106 may instead be performed by the content server 104). Additionally or alternatively, the content server 104 may be associated with the same entity that sources supplemental content items for populating supplemental content slots in the livestreams, in which case the system 100 may omit the supplemental content providers 108 (e.g., activities described herein for the supplemental content providers 108 may instead be performed by the content server 104).

Figure 2A:
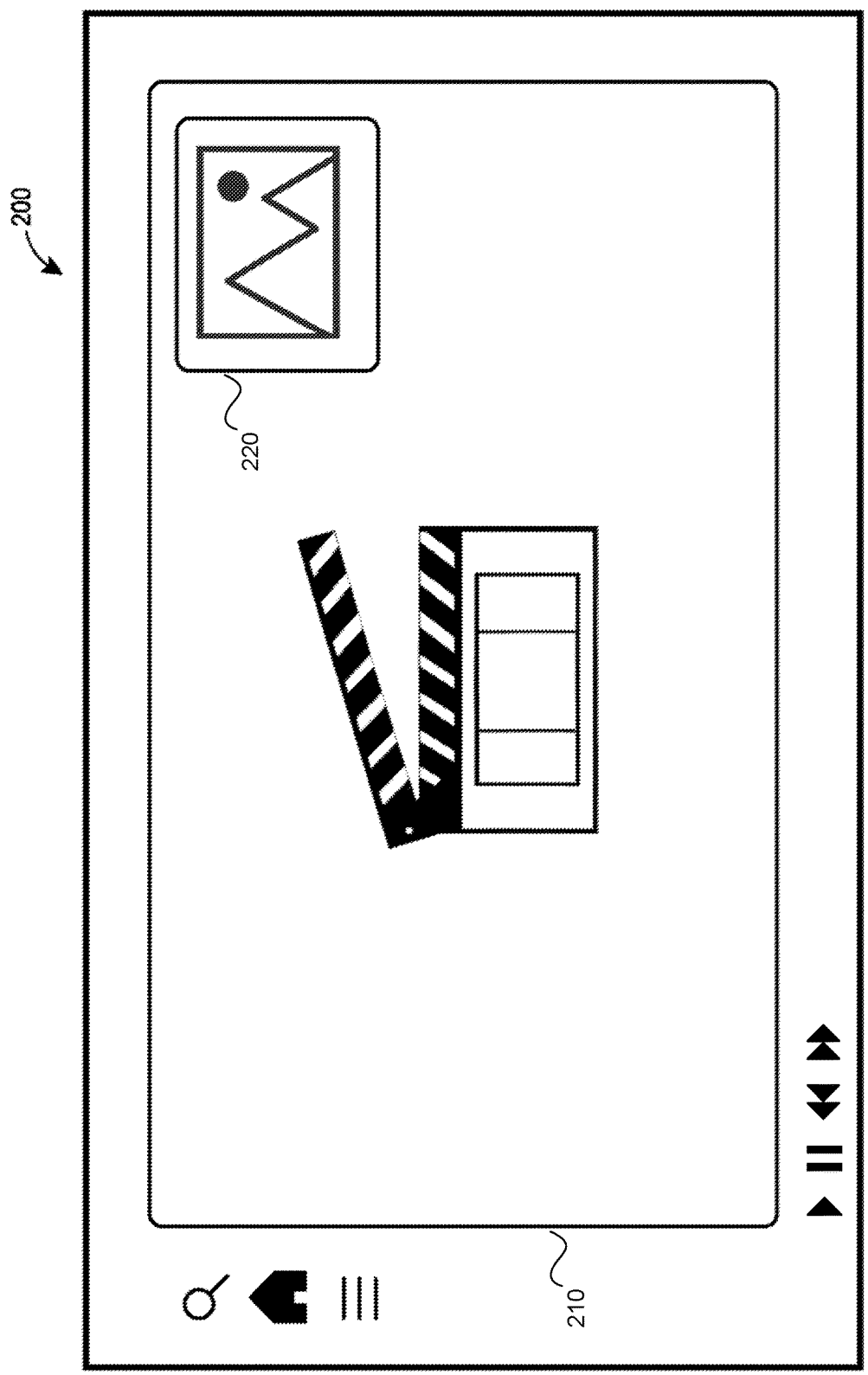
FIG. 2A depicts an exemplary client device user interface configured to display livestreams and supplemental content items.

FIG. 2A depicts an example user interface 200 for a video sharing application (e.g., YouTube), where the user interface may be provided as a web page (e.g., if application 130 is a web browser) or as a screen of a dedicated application (e.g., if application 130 is a dedicated video sharing application). The user interface 200 may include a primary content slot 210, and one or more supplemental content slots 220. The supplemental content slot 220 may correspond to the position at which a supplemental content item is displayed, with no visual indication of the slot 220 or its contents remaining after the supplemental content item is no longer being displayed. In some embodiments, the primary content slot 210 may be more prominent by having larger dimensions (height and/or width) than the supplemental content slot 220. In other embodiments, the supplemental content slot 220 is superimposed upon or adjacent to the primary content slot 210.

In some implementations where the application 130 is a web browser application and the user interface 200 is a web page hosted by one of publishers 106, the application 130 downloads and executes code (e.g., HTML code) of the web page in order to present the web page via display 126. The web page code may also include a script (e.g., JavaScript) that, when interpreted by the application 130, causes the client device 102 to request, from the content server 104 or publisher 106, a livestream to be presented in the primary content slot 210. The livestream may include video and/or audio content. The web page code or livestream may include a script that, when interpreted by the application 130, causes the client device 102 to request, from the content server 104, a supplemental content item to be displayed in the supplemental content slot 220. The supplemental content item may include video, audio, text, and/or image content. In some implementations where application 130 is instead a dedicated application that generates the user interface 200, the application 130 causes the client device 102 to request the livestream from the content server 104 or publisher 106 based upon user input.

In some implementations, the primary content slot 210 may shrink, i.e., reduced width and/or height, while the supplemental content slot 220 displays the supplemental content item. In some implementations, the supplemental content item may be displayed in the primary content slot 210, and the livestream may be skipped during display of the supplemental content item.

FIG. 2B depicts an audio broadcast 250 played by the application 130 (e.g., a streaming audio application). The client device 102 may be a smart home device (e.g., Google Nest), a smartphone, a computer, etc.

The audio broadcast 250 may include a livestream 260 comprising (e.g., consisting of only) audio content. The audio broadcast 250 may include a script or trigger that, when interpreted by the application 130, causes the client device 102 to request, from the content server 104, a supplemental content item 270 comprising audio content to be played. The application 130 may mute, reduce the volume of, or stop playing the livestream 260 while the supplemental content item 270 is being played. After the supplemental content item 270 has finished playing, the livestream 260 may resume playing.

It is to be understood that FIGS. 2A and 2B are for illustrative purposes only, and that the techniques described herein can instead apply to information resources with different numbers of content slots, different spatial sizes of content slots, different relative spatial positions of content slots, and so on.

Figure 3A:
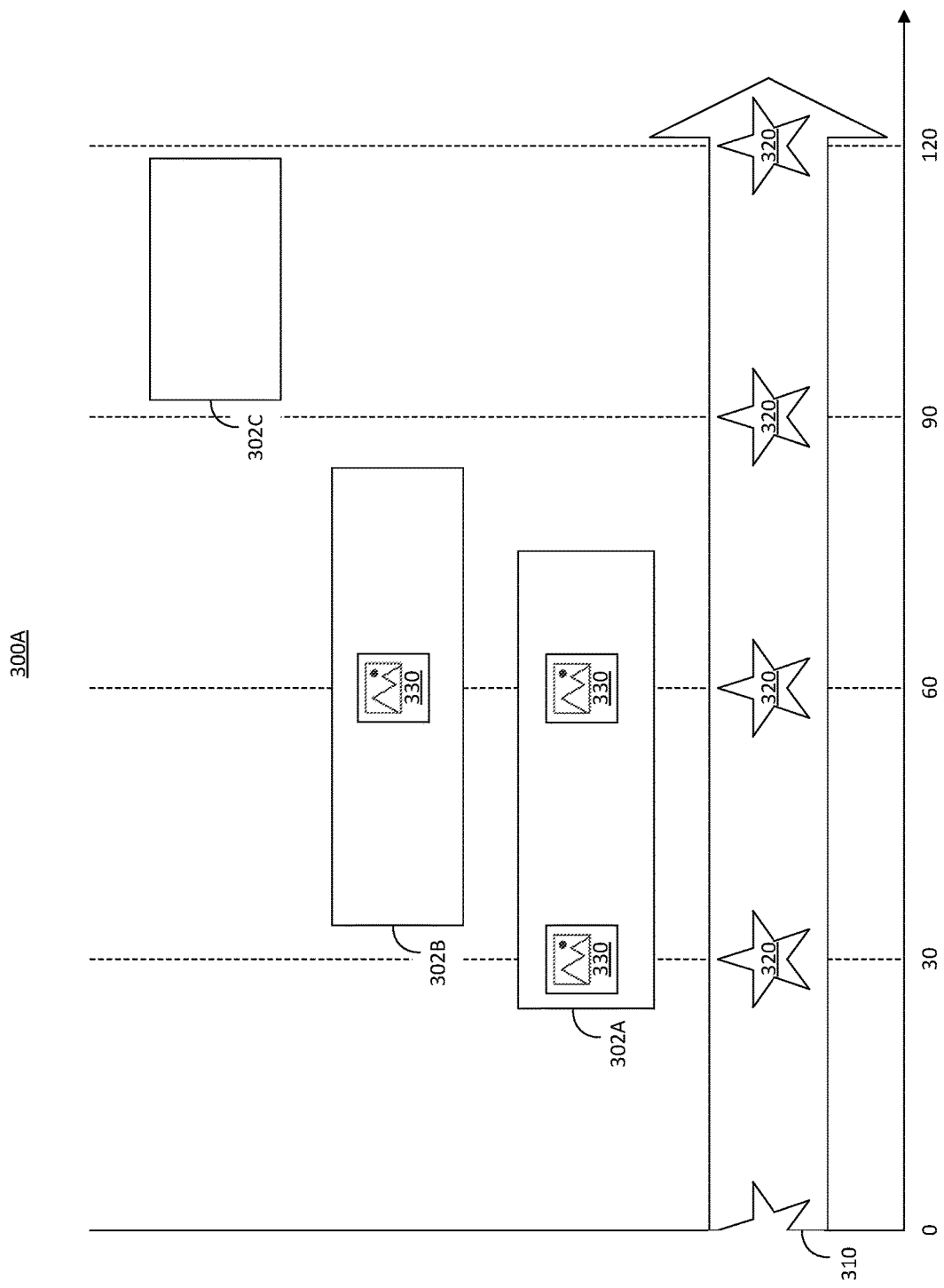
FIG. 3A depicts a timeline illustrating a prior art technique for providing a livestream and supplemental content items to client devices.

FIG. 3A depicts a timeline 300A illustrating a prior art technique for concurrently presenting supplemental content items during a livestream. As illustrated, a livestream 310 begins at 0 minutes and proceeds 120 minutes or longer. Client devices 302A, 302B, and 302C receive and play the livestream 310. Client device 302A joins the livestream 310 at 25 minutes and exits at 75 minutes. Client device 302B joins the livestream 310 at 35 minutes and exits at 85 minutes. And client device 302C joins the livestream 310 at 92 minutes and exits at 118 minutes.

The livestream 310 includes supplemental content break markers 320 spaced apart every 30 minutes, i.e., 0, 30, 60, 90, and 120 minutes into the livestream 310. At each supplemental content break marker 320, each client device 302A-302C receiving the livestream 310 is triggered to request and present a supplemental content item 330. Thus, client device 302A requests and presents a supplemental content item 330 at 30 and 60 minutes. Client device 302B requests and presents a supplemental content item 330 at 60 minutes. Despite client device 302C viewing or listening to the livestream 310 for a duration of 26 minutes, client device 302C does not request and present any supplemental content items 330.

Figure 3B:
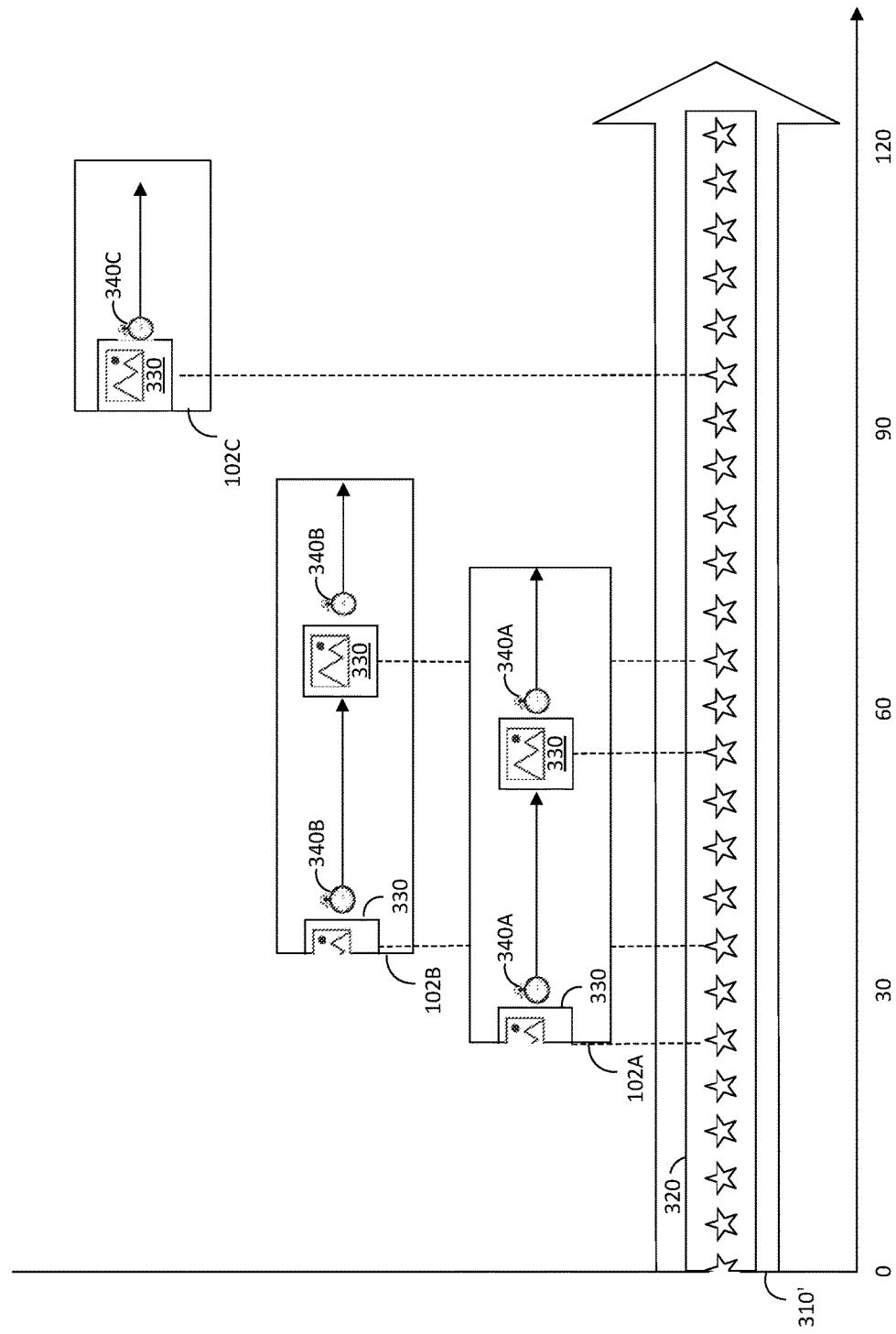
FIG. 3B depicts an exemplary timeline illustrating a technique of the present disclosure for providing a livestream and supplemental content items to client devices.

FIG. 3B depicts a timeline 300B illustrating one technique disclosed herein for non-concurrently presenting supplemental content during a livestream. Similar to FIG. 3A, a livestream 310' begins at 0 minutes and proceeds 120 minutes or longer. The duration of the livestream 310' may be less than, equal to, or greater than 120 minutes. In the illustrated example, client device 102A (e.g., one of client devices 102) joins the livestream 310' at 25 minutes and exits at 75 minutes, client device 102B (e.g., another of client devices 102) joins the livestream 310' at 35 minutes and exits at 85 minutes, and client device 102C (e.g., another of client devices 102) joins the livestream 310' at 92 minutes and exits at 118 minutes.

The livestream 310' may include supplemental content break markers 320 spaced apart at relatively short intervals, e.g., every 5 minutes. The interval between supplemental content break markers 320 may be specified by an administrator associated with the content server 104, or a provider associated with the livestream (e.g., a user associated with a publisher 106), for example. In some embodiments, when a client device 102A-102C first joins the livestream 310', the client device 102A-102C may be triggered to present a supplemental content item 330. In some embodiments, when the client device 102A-102C first joins the livestream 310', the client device may be triggered to present a supplemental content item 330 upon reaching the next of the supplemental content break markers 320.

In some embodiments, the client device 102A-102C may initialize an earlier event time 340 to (1) the time when the client device 102A-102C first joins the livestream 310', (2) the time when the client device 102A-102C first reaches one of the supplemental content break markers 320, and/or (3) at or immediately after the time the client device 102A-102C receives or presents the supplemental content item 330. Each client device 102A-102C can use its respective earlier event time 340A-340C to determine/track the elapsed time since an earlier event, which may be the client device 102A-102C first joining the livestream, the client device 102A-102C first reaching a supplemental content break marker, or client device 102A-102C last receiving or presenting a supplemental content item. Upon reaching the next of the supplemental content break markers 320, each client device 102A-102C may compare its respective elapsed time to a supplemental content interval. The supplemental content interval may specify a desired duration (e.g., 10 minutes, 15 minutes, 30 minutes, etc.) between receipts and/or presentations of subsequent supplemental content items 330. The supplemental content interval is longer than the interval between each successive one of the supplemental content break markers 320, and may be specified by an administrator associated with the content server 104, a provider associated with the livestream, a user associated with a publisher 106, or another person or entity.

In some embodiments, the client devices 102A-102C use a break marker counter to determine elapsed time, rather than a timer. For example, each of the client devices 102A-102C may increment a supplemental content break marker count when the client device reaches any one of the supplemental content break markers 320. The client device may then compare its respective supplemental content break marker count to a supplemental content count interval. The supplemental content count interval may specify a number of supplemental count break markers, e.g., five markers, between receipts or presentations of supplemental content items 330. In other embodiments, each of the client devices 102A-102C explicitly calculates its elapsed time from the count, rather than using the count as a proxy for elapsed time. The supplemental content count interval may be specified by an administrator associated with the content server 104, a provider associated with the livestream, or a user associated with a publisher 106, etc.

In some embodiments, if one of the client devices 102A-102C determines that its respective elapsed time is less than or equal to the supplemental content interval, then that client device neither requests nor presents a supplemental content item 320. If, however, one of the client device 102A-102C determines that its respective elapsed time exceeds the supplemental content interval, then that client device requests, receives, and presents one or more supplemental content items 330, and updates the earlier event time 340 to the time the supplemental content items 330 were requested, received, or presented.

In the scenario illustrated in FIG. 3B, client device 102A requests and presents a supplemental content item 330 at 25 and 55 minutes into the livestream 310'. Client device 102B requests and presents a supplemental content item 330 at 35 and 65 minutes into the livestream 310'. Client device 102C requests and presents a supplemental content item 330 at 95 minutes into the livestream 310'. Thus, when compared with the prior art timeline 300 in FIG. 3A, client device 102B presents two supplemental content items 330 (as compared to only one for client device 302B), and client device 102C presents one supplemental content item 330 (as compared to none for client device 302C). Further, in the prior art livestream 310, supplemental content items 330 are requested concurrently, so a content server may receive supplemental content requests from all the active client devices 302A-302C simultaneously, e.g., at 60 minutes into the livestream. However, in the example livestream 310', the non-concurrent supplemental content item requests occur 10 minutes apart, e.g., at 55 and 65 minutes into the livestream 310'.

In some embodiments, if one of the client devices 102A-102C determines that its supplemental content break marker count is less than or equal to the supplemental content count interval, then that client device neither requests nor presents a supplemental content item 320. If, however, the supplemental content count interval exceeds the supplemental content count interval, then the client device requests, receives, and presents one or more supplemental content items 330, and resets the supplemental content breaker marker count to one (or to zero).

Figure 3C:
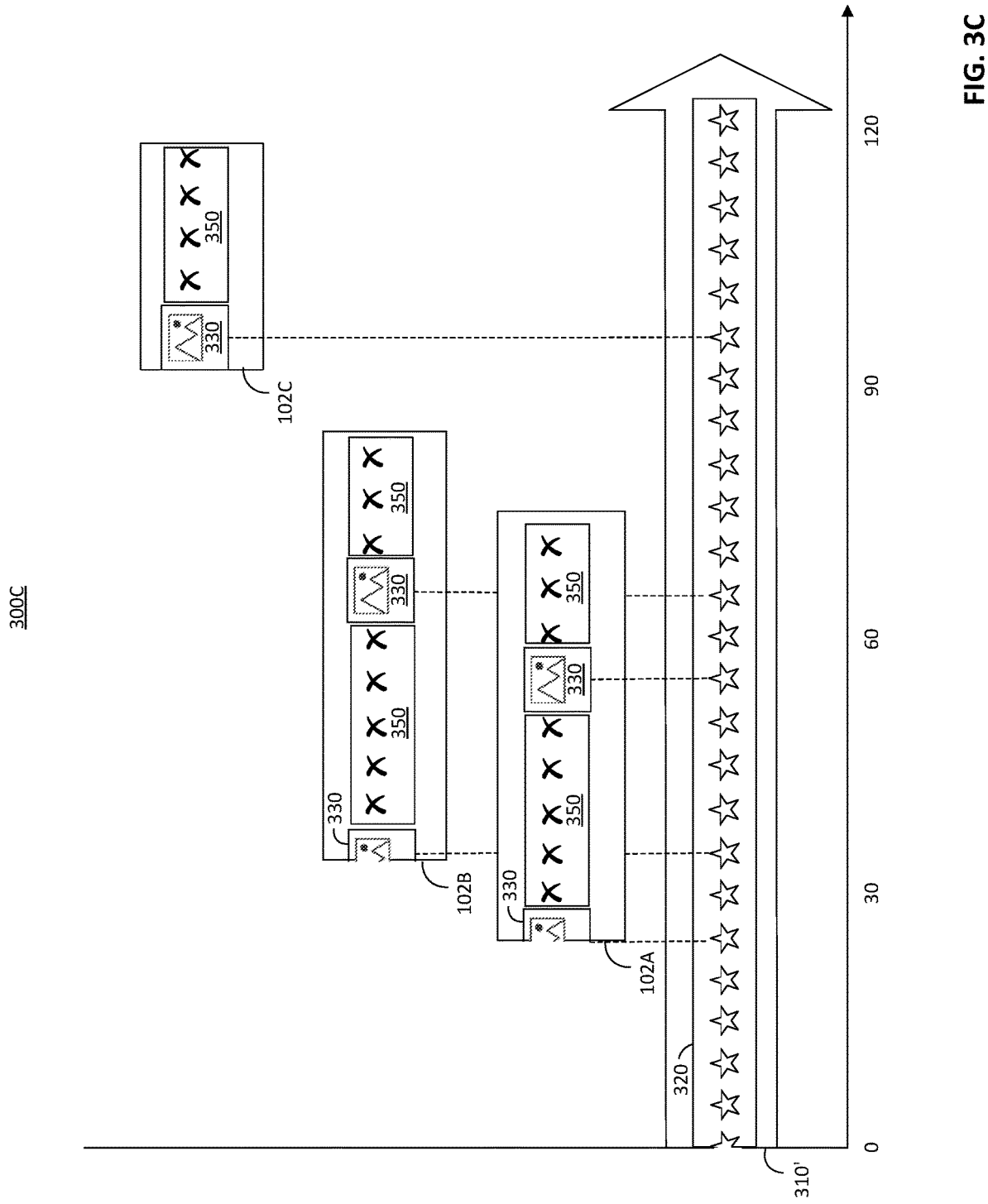
FIG. 3C depicts another exemplary timeline illustrating a technique of the present disclosure for providing a livestream and supplemental content items to client devices.

FIG. 3C depicts a timeline 300C illustrating another technique disclosed herein for non-concurrently presenting supplemental content items 330 during a livestream 310'. Similar to FIGS. 3A and 3B, the livestream 310' begins at 0 minutes and proceeds 120 minutes or longer, client device 102A joins the livestream 310 at 25 minutes and exits at 75 minutes, client device 102B joins the livestream 310' at 35 minutes and exits at 85 minutes, and client device 102C joins the livestream 310' at 92 minutes and exits at 118 minutes.

As in FIG. 3B, the livestream 310' may include supplemental content break markers 320 spaced apart at short, configurable intervals, e.g., every 5 minutes. And in some embodiments, a client device 102A-102C may be triggered to request and present a supplemental content item 330 when first joining the livestream 310' or when reaching the next supplemental content break marker 320. When one of client devices 102A-102C reaches a supplemental content break marker 320, that client device requests a supplemental content item 330 from the content server 104.

In some embodiments, when the content server 104 receives the request for a supplemental content item 330 from one of the client devices 102A-102C, the content server 104 subtracts the request time from an earlier event time 340A-340C associated with that client device in order to determine an elapsed time for that client device. If the elapsed time is less than or equal to the supplemental content interval, the content server 104 provides nothing, a null value, or a resume livestream instruction 350. If, however, the elapsed time exceeds the supplemental content interval, the content server 104 provides a supplemental content item to the client device.

In some embodiments, the content server 104 determines supplemental content item demand. The supplemental content item demand may be a number of supplemental content items requested per second, supplemental content items served per second, supplemental content item bandwidth usage, processor usage of a content serving process, and/or any other suitable metric. The supplemental content item demand may be transmitted by the supplemental content providers 108. The content server 104 may compare the supplemental content item demand to a specified threshold value. If the supplemental content item demand exceeds a specified threshold, i.e., a demand spike occurs, the content server 104 may attempt to limit the demand spike by incrementing the time of the earlier event by a specified value for one or more of the client devices 102. It is understood that "incrementing [or modifying, etc.] the earlier time" does not refer to changing the time at which the earlier event actually occurs, but rather changing the earlier event time for purposes of calculating or determining when one of the client devices 102 is to send a request for a supplemental content item. Incrementing the earlier event time may postpone/offset the content item requests from one or more of the client devices 102, thus "smoothing" the demand spike. The specified value of the increment may be a fixed interval, e.g., 1 minute, or may be an interval randomly selected within a range, e.g., 1-4 minutes. More generally, the content server 104 may smooth out the demand by modifying the earlier event time in either direction (incrementing or decrementing). In some implementations, the content server 104 modifies the earlier event time of different client devices 102 by random amounts, irrespective of (i.e., without checking) supplemental content item demand.

In some embodiments, the content server 104 uses a break marker counter to determine elapsed time, rather than a timer. For example, when the content server 104 receives the request for a supplemental content item 330, the content server 104 increments a supplemental content break marker count for the client device. The content server 104 may compare the supplemental content break marker count to a supplemental content count interval. The supplemental content count interval may specify a number of supplemental count break markers, e.g., five markers, between provisions of supplemental content items 330. In other embodiments, the content server 104 explicitly calculates its elapsed time from the count, rather than using the count as a proxy for elapsed time. The supplemental content count interval is longer than the interval between each successive one of the supplemental content break markers 320 and may be specified by an administrator associated with the content server 104, a provider associated with the livestream, or a user associated with a publisher 106. If the supplemental content break marker count is less than or equal to the supplemental content count interval, the content server 104 provides nothing, a null value, or a resume livestream instruction 350. If, however, the supplemental content break marker count exceeds the supplemental content count interval, the content server 104 provides a supplemental content item to the client device.

Figure 4:
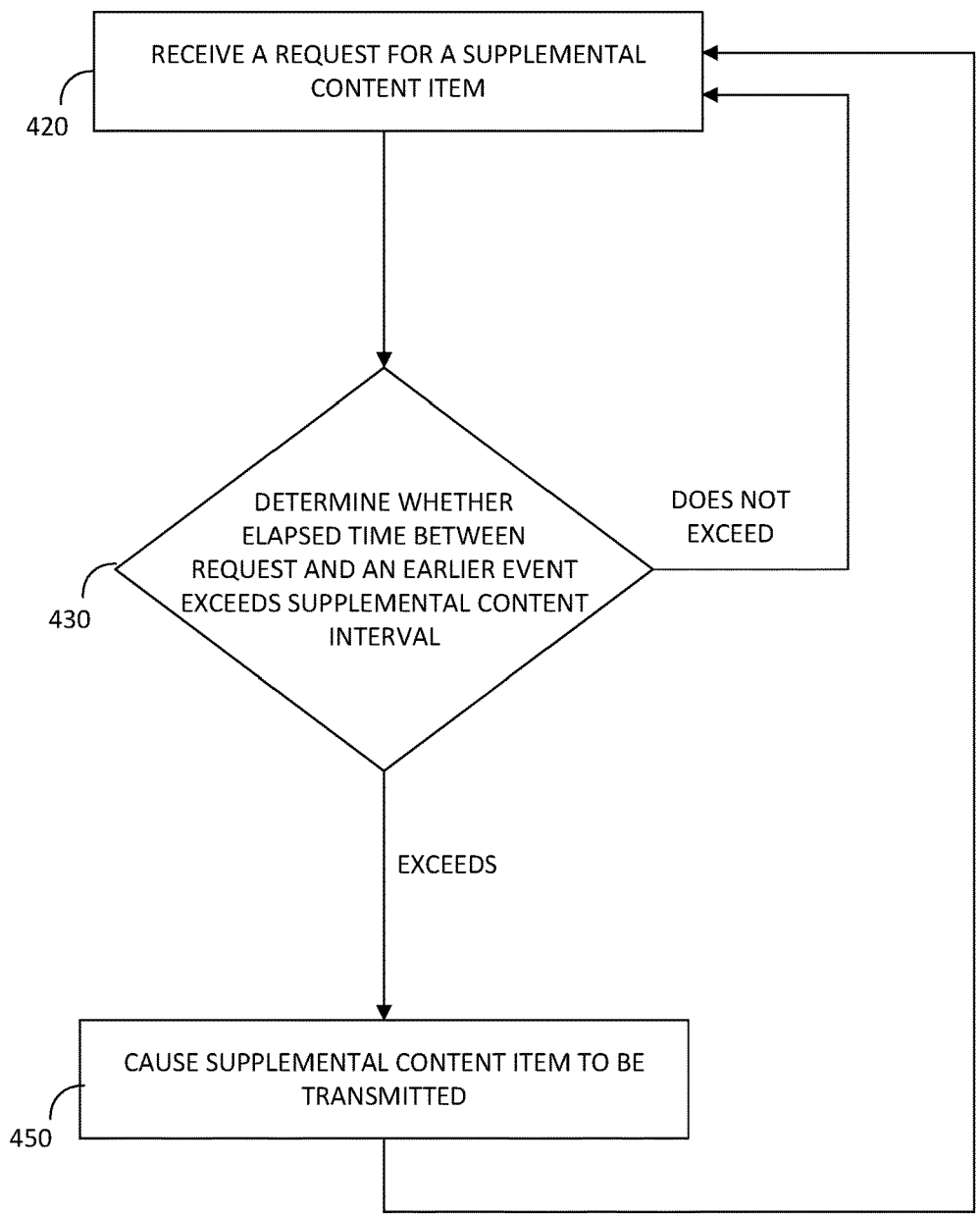
FIG. 4 is a flow diagram of an example method for providing supplemental content to a client device receiving a livestream.

FIG. 4 depicts a flow diagram of an exemplary computer-implemented method 400 for non-concurrently presenting supplemental content items during a livestream. The livestream may include a plurality of supplemental content break markers spaced apart in time according to a break interval. The content server 104 or a publisher 106 may transmit the livestream. The livestream may include video and/or audio content. One or more steps of the method 400 may be implemented as a set of instructions stored on a computer-readable memory and executable on one or more processors. The method 400 of FIG. 4 may be performed/implemented by a device or system, such as the client device 102 and/or content server 104.

The example method 400 includes, at block 420, receiving a request for a supplemental content item from a client device (e.g., client device 102). The request for a supplemental content item may be received at a request time. The client device may send the request upon reaching one of the plurality of supplemental content break markers.

The method 400 also includes, at block 430, determining whether an elapsed time between the request and the earlier event exceeds a supplemental content interval. The supplemental content interval may be greater than the break interval. The supplemental content interval may be configured by an administrator of the content server (e.g., content server 104), a provider of the livestream, or a user associated with the publisher 106, for example. The earlier event may be (1) a supplemental content item last being requested by or provided to the client device; or (2) a notification of the client device joining the livestream being received. In one embodiment, the method 400 includes returning to block 420 if the elapsed time does not exceed the supplemental content interval and proceeding to block 450 if the elapsed time exceeds the supplemental content interval.

In one embodiment, the method 400 includes determining whether a supplemental content item count associated with the client device equals a maximum supplemental content count.

In one embodiment, the method 400 includes returning to block 420 if the supplemental content item count equals the maximum supplemental content count. The computer-implemented method may include proceeding to block 450 if the supplemental content item count does not equal the maximum supplemental content count.

In one embodiment, the computer-implemented method 400 includes at block 450 causing a supplemental content item to be transmitted to the client device 102. The content server 104 or a supplemental content provider 108 may transmit the supplemental content item. The content server 104 may receive the supplemental content item from the supplemental content provider 108 and transmit the supplemental content item to the client device 102. The client device 102 may receive the supplemental content item from the supplemental content provider 108. The client device 102 may present the supplemental content item in place of the livestream. The client device 102 may present the supplemental content item while the livestream continues playing. The supplemental content item may include text, image, audio, and/or video content.

In one embodiment, the computer-implemented method 400 may include incrementing, responsive to causing the supplemental content item to be transmitted to the client device, incrementing the supplemental content item count.

In some aspects, blocks 420-450 may be repeated during the time that the livestream is provided.

It should be understood that not all blocks of the exemplary computer-implemented method 400 are required to be performed. Moreover, the exemplary computer-implemented method 400 is not mutually exclusive (i.e., block(s) from exemplary computer-implemented method 400 may be performed in any particular implementation).

Figure 5:
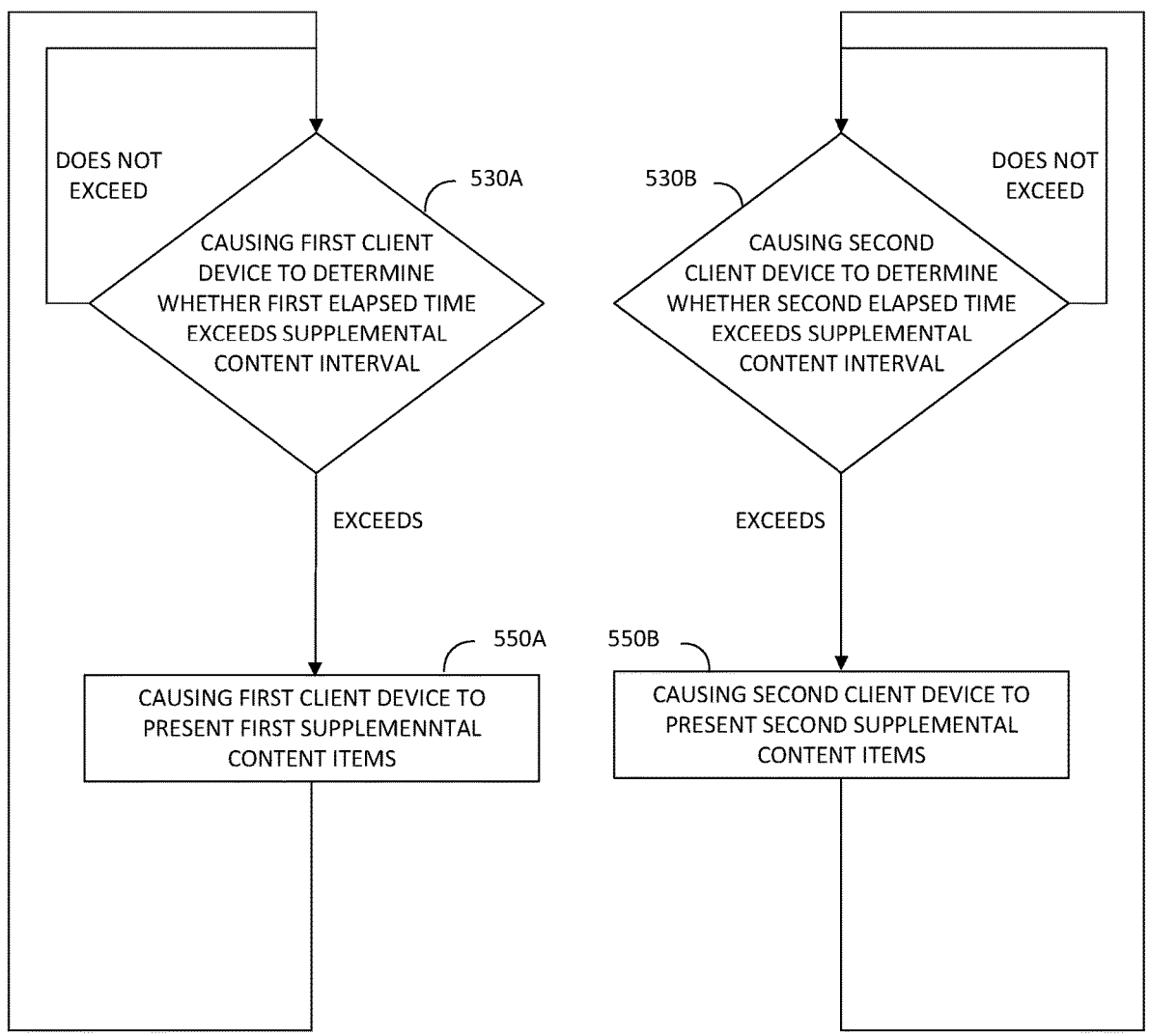
FIG. 5 is a flow diagram of another example method for providing supplemental content to a client device receiving a livestream.

FIG. 5 depicts a flow diagram of another exemplary computer-implemented method 500 for non-concurrently presenting supplemental content items during a livestream. The livestream may include a plurality of supplemental content break markers spaced apart in time according to a break interval. The content server 104 or a publisher 106 may transmit the livestream. The livestream may include video and/or audio content. One or more steps of the method 500 may be implemented as a set of instructions stored on a computer-readable memory and executable on one or more processors. The method 500 of FIG. 5 may be implemented via a system, such as the client devices 102 and/or content server 104.

In one embodiment, the computer-implemented method 500 includes at block 530A causing the first client device 102 to determine whether a first elapsed time since a first client earlier event time exceeds the supplemental content interval. The computer-implemented method 500 may include at block 530B causing the second client device 102 to determine whether a second elapsed time since a second client earlier event time exceeds the supplemental content interval. The first client earlier event and second client earlier event may indicate (1) the last time when a supplemental content item was requested from or provided to the client device; or (2) the time when a notification of the client device joining the livestream was received. The first client earlier event may occur at a different time than the second client earlier event. The determination at blocks 530A and 530B may occur when the first client device 102 or the second client device 102, respectively, reaches one of the plurality of supplemental content break markers. In one embodiment, the computer-implemented method 500 includes returning to block 530A if the first elapsed time does not exceed the supplemental content interval and proceeding to block 550A if the elapsed time exceeds the supplemental content interval. The computer-implemented method 500 may include returning to block 530B if the second elapsed time does not exceed the supplemental content interval and proceeding to block 550B if the elapsed time exceeds the supplemental content interval.

In one embodiment, the computer-implemented method 500 includes causing the first client device to determine whether a first supplemental content item counter is equal to a maximum supplemental content count and causing the second client device to determine whether a second supplemental content item counter is equal the maximum supplemental content count. The determination may occur when the first client device and/or the second client device reaches one of the plurality of supplemental content break markers.

In one embodiment, the computer-implemented method 500 returns to block 530A if the first supplemental content item counter equal to a maximum supplemental content count and proceed to block 550A if the first supplemental content item counter does not equal the maximum supplemental content count. The computer-implemented method 500 may return to block 530B if the first supplemental content item counter equal to a maximum supplemental content count and proceed to block 550B if the first supplemental content item counter does not equal the maximum supplemental content count.

In one embodiment, the computer-implemented method 500 includes at block 550A causing the first client device 102 to present one or more first supplemental content items. The computer-implemented method 500 may include at block 550B causing the second client device 102 to present one or more second supplemental content items. The content server 104 or a supplemental content provider 108 may transmit the first supplemental content items and/or second supplemental content items. The first client device 102 and/or second client device 102 may receive the supplemental content item from the supplemental content provider 108. The first client device 102 and/or second client device 102 may request the first supplemental content item and second supplemental content item from the supplemental content provider 108. The first client device 102 and/or second client device 102 may present the first supplemental content item and the second supplemental content item in place of the livestream. The first client device 102 and/or second client device 102 may present the first supplemental content item and the second supplemental content item while the livestream continues playing. The first client device and/or second client device 102 may increment the first supplemental content item counter and the second supplemental content item counter for each first supplemental content item and second supplemental content item presented. The first supplemental content item and the second supplemental content items may include text, image, audio, or video content.

In some aspects, blocks 530A-550A and blocks 530B-550B may be repeated during the time that the livestream is transmitted.

It should be understood that not all blocks of the exemplary computer-implemented method 500 are required to be performed. Moreover, the exemplary computer-implemented method 500 is not mutually exclusive (i.e., block(s) from exemplary computer-implemented method 500 may be performed in any particular implementation).

Figure 6:
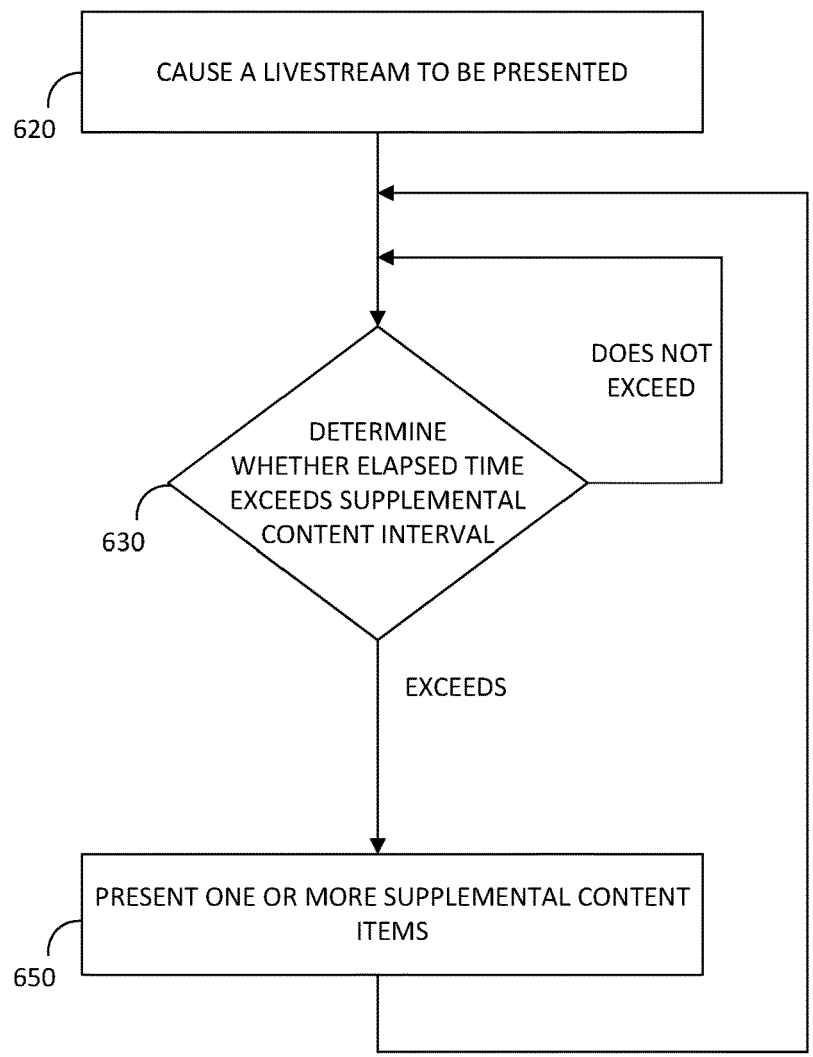
FIG. 6 is a flow diagram of an example method for presenting a livestream and supplemental content at a client device.

FIG. 6 depicts a flow diagram of an exemplary computer-implemented method 600 for non-concurrently receiving supplemental content items during a livestream. The livestream may include a plurality of supplemental content break markers spaced apart in time according to a break interval. The content server 104 or a publisher 106 may transmit the livestream. The livestream may include video and/or audio content. One or more steps of the method 600 may be implemented as a set of instructions stored on a computer-readable memory and executable on one or more processors. The method 600 of FIG. 6 may be implemented via a system, such as the client devices 102 and/or content server 104.

In one embodiment, the computer-implemented method 600 includes causing the livestream to be presented to a user. Causing the livestream to be presented may include receiving the livestream from the content server 104 or the publisher 106. Causing the livestream to be presented may include presenting the livestream on the display 126 and/or speaker 128.

In one embodiment, the computer-implemented method 600 includes at block 630, while presenting the livestream, determining whether an elapsed time since an earlier event time exceeds a supplemental content interval. The earlier event may indicate (1) the last time when a supplemental content item was received or presented by the client device 102; or (2) the time when the client device 102 joined the livestream. The supplemental content interval may be greater than the break interval. The supplemental content interval may be configured by an administrator of the content server 104, a provider of the livestream, or a user associated with the publisher 106. The determination may occur when the client device 102 reaches one of the plurality of supplemental content break markers. In one embodiment, the computer-implemented method 600 includes returning to block 630 if the elapsed time does not exceed the supplemental content interval and proceeding to block 650 if the elapsed time exceeds the supplemental content interval.

In one embodiment, the computer-implemented method 600 includes determining whether a supplemental content item counter is equal to a maximum supplemental content count. The determination may occur when the client device 102 reaches one of the plurality of supplemental content break markers.

In one embodiment, the computer-implemented method 600 returns to block 630 if the supplemental content item counter is equal to a maximum supplemental content count and proceeds to block 650 if the supplemental content item counter does not equal the maximum supplemental content count.

In one embodiment, the computer-implemented method 600 includes at block 650 presenting one or more supplemental content items. The content server 104 or a supplemental content provider 108 may transmit the supplemental content items to the client device 102. The client device 102 may receive the supplemental content item from the supplemental content provider 108. The client device 102 may request the supplemental content item. The client device 102 may present the supplemental content item in place of the livestream. The client device 102 may present the supplemental content item. The client device 102 may increment the supplemental content item counter for each supplemental content item. The supplemental content item may include text, image, audio, or video content.

In some aspects, blocks 620-650 may be repeated during the time that the livestream is received.

It should be understood that not all blocks of the exemplary computer-implemented method 600 are required to be performed. Moreover, the exemplary computer-implemented method 600 is not mutually exclusive (i.e., block(s) from exemplary computer-implemented method 600 may be performed in any particular implementation).

Although the foregoing text sets forth a detailed description of numerous different aspects and implementations of the invention, it should be understood that the scope of the patent is defined by the words of the claims set forth at the end of this patent. The detailed description is to be construed as exemplary only and does not describe every possible implementation because describing every possible implementation would be impractical, if not impossible. Numerous alternative implementations could be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or implementation. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for efficiently selecting and providing client devices with supplemental content to fill supplemental content slots of information resources through the principles described herein. Thus, while particular implementations and applications have been illustrated and described, it is to be understood that the disclosed implementations are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A computer-implemented method for providing supplemental content during a livestream comprising a plurality of supplemental content break markers spaced apart in time according to a break interval, the computer-implemented method comprising:
   receiving, by one or more processors, from a client device of a plurality of client devices, and responsive to the livestream reaching one of the plurality of supplemental content break markers, a request for a supplemental content item;
   determining, by the one or more processors, whether an elapsed time between the request for the supplemental content item and an earlier event exceeds a supplemental content interval, wherein the supplemental content interval is greater than the break interval, wherein the earlier event is a notification of the client device joining the livestream; and
   responsive to determining that the elapsed time exceeds the supplemental content interval, causing, by the one or more processors, the supplemental content item to be transmitted to the client device.

2. The computer-implemented method of claim 1, further comprising:
   modifying, by the one or more processors, a time of the earlier event for the client device; and
   calculating, by the one or more processors, the elapsed time based on the modified time of the earlier event.

3. The computer-implemented method of claim 1, wherein causing the supplemental content item to be transmitted causes the client device to:
   present the supplemental content item in place of the livestream.

4. The computer-implemented method of claim 1, wherein the livestream comprises a first video, and the supplemental content item comprises a second video.

5. The computer-implemented method of claim 1, further comprising:
   determining, by the one or more processors, whether a supplemental content item count associated with the client device equals a maximum supplemental content count; and responsive to determining that the supplemental content item count does not equal the maximum supplemental content count, incrementing, by the one or more processors, the supplemental content item count, wherein causing the supplemental content item to be transmitted to the client device is further responsive to determining that the supplemental content item count does not equal the maximum supplemental content count.

6. The computer-implemented method of claim 1, wherein causing the supplemental content item to be transmitted to the client device comprises:

receiving the supplemental content item from a supplemental content provider; and transmitting the supplemental content item to the client device.

7. The computer-implemented method of claim 1, wherein the supplemental content interval is configurable by a provider of the livestream.

8. A computer-implemented method for presenting supplemental content items during a livestream comprising a plurality of supplemental content break markers spaced apart in time according to a break interval, the computer-implemented method comprising:

causing, by one or more processors, the livestream to be presented to a user;

while presenting the livestream, determining, by the one or more processors and upon the livestream reaching one of the plurality of supplemental content break markers, whether an elapsed time since an earlier event exceeds a supplemental content interval, wherein the supplemental content interval is greater than the break interval, wherein the earlier event is the user joining the livestream; and responsive to determining that the elapsed time exceeds the supplemental content interval, causing, by the one or more processors, one or more supplemental content items to be presented to the user.

9. The computer-implemented method of claim 8, wherein the livestream comprises a first video and the one or more supplemental content items comprise a second video.

10. The computer-implemented method of claim 8, further comprising:

determining, by the one or more processors, whether a supplemental content item count equals a maximum supplemental content count; and responsive to determining that the supplemental content item count does not equal the maximum supplemental content count, incrementing, by the one or more processors, the supplemental content item count, wherein presenting the one or more supplemental content items is further responsive to determining that the supplemental content item count does not equal the maximum supplemental content count.

11. The computer-implemented method of claim 8, wherein presenting the one or more supplemental content items comprises:

requesting the one or more supplemental content items from a supplemental content provider; and receiving the one or more supplemental content items from the supplemental content provider.

12. The computer-implemented method of claim 8, wherein the supplemental content interval is configured by a provider of the livestream.

13. The computer-implemented method of claim 8, wherein presenting the one or more supplemental content items occurs while the livestream continues playing.

\* \* \* \* \*